United States Patent
Biran et al.

(10) Patent No.: US 11,875,108 B2
(45) Date of Patent: *Jan. 16, 2024

(54) ANNOTATING DOCUMENTS ON A MOBILE DEVICE

(71) Applicant: OPEN TEXT HOLDINGS, INC., San Mateo, CA (US)

(72) Inventors: Daniel Biran, San Jose, CA (US); Matthew Riley Dean, San Francisco, CA (US); David Gee Louie, Mountain View, CA (US); Justin Fiedler, La Jolla, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,805

(22) Filed: Jun. 1, 2021

(65) Prior Publication Data

US 2021/0286939 A1  Sep. 16, 2021

Related U.S. Application Data

(63) Continuation of application No. 16/835,291, filed on Mar. 30, 2020, now Pat. No. 11,030,396, which is a (Continued)

(51) Int. Cl.
*G06F 40/169* (2020.01)
*G06F 3/0485* (2022.01)
*G06F 3/0488* (2022.01)

(52) U.S. Cl.
CPC .......... *G06F 40/169* (2020.01); *G06F 3/0485* (2013.01); *G06F 3/0488* (2013.01)

(58) Field of Classification Search
CPC ...... G06F 40/169; G06F 3/048; G06F 3/0482; G06F 3/0485; G06F 3/0488
See application file for complete search history.

(56) References Cited

U.S. PATENT DOCUMENTS 6,484,156 B1 * 11/2002 Gupta .................... G06F 16/48
707/999.001
7,962,846 B2  6/2011 Lerner et al.
(Continued)

OTHER PUBLICATIONS

Office Action issued for U.S. Appl. No. 15/084,000, dated Apr. 18, 2017, 14 pages.
(Continued)

*Primary Examiner* — Scott T Baderman
*Assistant Examiner* — Mario M Velez-Lopez
(74) *Attorney, Agent, or Firm* — Sprinkle IP Law Group

(57) ABSTRACT

A method includes executing an application at a mobile device to provide a graphical user interface and interact with a content server to display an image stored at the content server on a display of the mobile device; while displaying the image, receiving a first user input for a first annotation to the image based on user interaction with the graphical user interface, the first user input indicating a first region of the image; based on the first user input, displaying a text entry box together with a selection box in the graphical user interface, the selection box defining a region of the image with which the first annotation is to be associated; receiving a first comment via the text entry box; and responsive to second user input, sending the first comment and a location of the selection box to the content server for storage as the first annotation.

19 Claims, 11 Drawing Sheets

Related U.S. Application Data continuation of application No. 15/084,000, filed on Mar. 29, 2016, now Pat. No. 10,606,941.

(60) Provisional application No. 62/203,359, filed on Aug. 10, 2015.

(56) References Cited

U.S. PATENT DOCUMENTS

| | | | |
|---|---|---|---|
| 8,555,198 B2* | 10/2013 | Beezer | G06F 40/169 715/802 |
| 8,566,353 B2 | 10/2013 | Fink et al. | |
| 8,732,181 B2 | 5/2014 | Massand | |
| 8,769,491 B1 | 7/2014 | Conti et al. | |
| 8,879,870 B2 | 11/2014 | Vitsnudel et al. | |
| 8,902,259 B1* | 12/2014 | Zheng | G06F 3/0488 345/661 |
| 8,984,405 B1* | 3/2015 | Geller | G06F 3/04817 715/753 |
| 9,275,684 B2 | 3/2016 | Amento et al. | |
| 9,424,281 B2 | 8/2016 | Smith et al. | |
| 9,930,247 B2 | 3/2018 | Park et al. | |
| 9,953,216 B2 | 4/2018 | Alvarez | |
| 10,417,267 B2 | 9/2019 | Fume et al. | |
| 10,606,941 B2 | 3/2020 | Biran | |
| 10,642,480 B2 | 5/2020 | Kim et al. | |
| 11,030,396 B2 | 6/2021 | Biran et al. | |
| 2001/0051909 A1 | 12/2001 | Keith | |
| 2002/0099552 A1* | 7/2002 | Rubin | G09F 27/00 704/270 |
| 2007/0245243 A1* | 10/2007 | Lanza | H04N 7/17318 715/205 |
| 2007/0268315 A1 | 11/2007 | Hoshino | |
| 2007/0291297 A1 | 12/2007 | Harmon et al. | |
| 2008/0168073 A1 | 7/2008 | Siegel et al. | |
| 2009/0063492 A1 | 3/2009 | Meyyappan et al. | |
| 2010/0231721 A1 | 9/2010 | Meloche et al. | |
| 2010/0287473 A1 | 11/2010 | Recesso et al. | |
| 2010/0313128 A1 | 12/2010 | Phillips et al. | |
| 2011/0113320 A1* | 5/2011 | Neff | G06Q 10/10 707/827 |
| 2012/0210274 A1* | 8/2012 | Pettigrew | G06T 11/001 715/810 |
| 2013/0097481 A1* | 4/2013 | Kotler | G06F 16/34 715/230 |
| 2013/0145269 A1* | 6/2013 | Latulipe | G06F 3/048 715/720 |
| 2013/0167075 A1* | 6/2013 | Chanda | G06F 3/0481 715/781 |
| 2013/0191720 A1 | 7/2013 | Simons et al. | |
| 2013/0326340 A1 | 12/2013 | Woo et al. | |
| 2014/0164900 A1* | 6/2014 | Zeng | G06F 40/169 715/230 |
| 2014/0187315 A1 | 7/2014 | Perry | |
| 2014/0276057 A1 | 9/2014 | Lee et al. | |
| 2015/0035959 A1* | 2/2015 | Amble | A61B 5/0077 348/74 |
| 2015/0046828 A1 | 2/2015 | Desai et al. | |
| 2015/0154165 A1* | 6/2015 | O'Donoghue | G06Q 10/10 715/230 |
| 2015/0261752 A1 | 9/2015 | Li et al. | |
| 2016/0170591 A1* | 6/2016 | Heo | G06F 3/04883 715/777 |
| 2016/0247535 A1 | 8/2016 | Latulipe et al. | |
| 2017/0046321 A1 | 2/2017 | Biran | |
| 2017/0052939 A1 | 2/2017 | Seol et al. | |
| 2020/0226320 A1 | 7/2020 | Biran | |

OTHER PUBLICATIONS

Animation: Animated Page Transitions with jQuery NOUPE, May 17, 2015, pp. 1-8., <<http://www.noupe.com/development/animsition-user-friendly-jquery-plugin-for-animald-page-transitions-88632.html>>.

Office Action issued for U.S. Appl. No. 15/084,000, dated Nov. 16, 2017, 16 pages.

Office Action issued for U.S. Appl. No. 15/084,000, dated Apr. 9, 2018, 16 pages.

Comment on a "Track on SoundCloud" by grovo.com, published Jul. 22, 2013, pp. 1 <<https://www.youtube.com/watch?v+K9ATeZLkcg8.

Office Action issued for U.S. Appl. No. 15/084,000, filed Dec. 26, 2018, 17 pages.

Office Action issued for U.S. Appl. No. 15/084,000, dated Apr. 15, 2019, 16 pages.

Office Action for U.S. Appl. No. 16/835,291, dated Oct. 28, 2020, 14 pgs.

* cited by examiner

ANNOTATING DOCUMENTS ON A MOBILE DEVICE

CROSS-REFERENCE TO RELATED APPLICATIONS

This application is a continuation of, and claims a benefit of priority under 35 U.S.C. 120 of the filing date of U.S. patent application Ser. No. 16/835,291, filed Mar. 30, 2020, issued as U.S. Pat. No. 11,030,396, entitled "ANNOTATING DOCUMENTS ON A MOBILE DEVICE," which is a continuation of, and claims a benefit of priority under 35 U.S.C. 120 of the filing date of U.S. patent application Ser. No. 15/084,000, filed Mar. 29, 2016, issued as U.S. Pat. No. 10,606,941, entitled "ANNOTATING DOCUMENTS ON A MOBILE DEVICE," which is claims the benefit of U.S. Provisional Patent Application No. 62/203,359, filed Aug. 10, 2015, the entire contents of which are hereby expressly incorporated by reference for all purposes.

BACKGROUND

This disclosure relates generally to annotating electronic content, and in particular to integrating content viewing and annotation within a single user interface.

Document collaboration tools are becoming a popular resource for users collaborating on production or editing of electronic content. When collaborating on a document, users often communicate their suggestions or opinions for the document to other users by directly annotating the document or by providing comments via a separate communication channel, such as email. Generally, document collaboration tools enable users to create static annotations of documents. That is, a user can add text, images, or other annotations into the document file that can be distributed to other users, but the other users cannot respond to the annotation without modifying the annotation or adding another annotation to the document. Accordingly, users of the document collaboration tools may use a separate communication channel to discuss the document. The users therefore often switch between applications to view the document and comment on the document, which is inconvenient to the users. In particular, such application switching is challenging on a mobile device with limited display area, which often lack space to simultaneously display both a document and a communication application.

SUMMARY

A computing device provides a convenient and easy-to-use interface for creating, modifying, and viewing annotations associated with electronic content. The annotation methods provided by the computing device allow users to manage annotations associated with any of a variety of types of electronic content, such as images, multipage documents, or videos.

The computing device displays the electronic content, which is associated with a plurality of annotations each corresponding to a portion of the content (such as a spatial region, a spatial region at a specified time, or a spatial region on a specified page). The computing device also displays a first annotation, which includes one or more comments received from users and which is associated with a first portion of the electronic content. While displaying the first annotation, an input to display a second annotation is received. The second annotation is associated with a second portion of the electronic content, and includes one or more comments associated with the second portion. In response to receiving the input, the computing device displays the second portion of the electronic content and the one or more comments associated with the second portion.

The features and advantages described in this summary and the following detailed description are not all-inclusive. Many additional features and advantages will be apparent to one of ordinary skill in the art in view of the drawings, specification, and claims.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
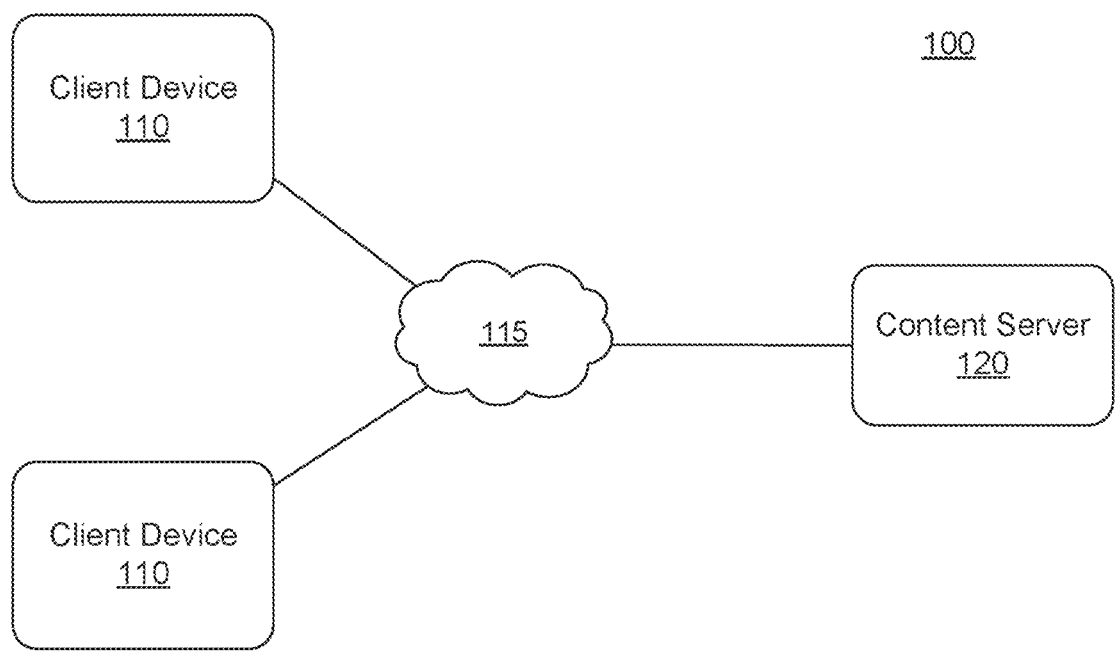
FIG. 1 illustrates an example system environment for annotating electronic content, according to one embodiment.

FIG. 1 illustrates an example system environment 100 for annotating documents, according to one embodiment. In one embodiment, the environment 100 includes one or more client devices 110 and a content server 120 communicating with the client devices 110 over a network 115.

The client device 110 displays electronic content and annotations associated with the content to a user. The client device 110 may display and facilitate user annotations of any of a variety of types of electronic content, including documents such as images, slide decks, or PDFs, as well as video or audio files. The client device 110 may be any user computing device, such as a desktop computer, a laptop computer, a tablet, or a mobile phone. The client device 110 includes one or more input devices for receiving inputs from a user, such as a touchscreen display or a mouse and keyboard. In one embodiment, the client device 110 executes an application allowing a user of the client device 110 to interact with electronic content. For example, the client device 110 executes a browser application or a native application that interacts with the content server 120 to display content stored at the content server 120 to a user of the client device 110.

The client device 110 enables users to annotate the content and view annotations associated with the content. As described below with respect to FIGS. 2A-6F, the client device 110 integrates annotation functionality into a content viewer. By providing content viewing and annotation within a single interface, the client device 110 enables users to easily annotate electronic content without, for example, switching between applications on the client device 110. As used herein, an "annotation" is a set of one or more comments from users of the client devices 110 that is associated with a specified portion of content. Each comment includes a user response to the specified portion of content, and may include text, images, links, or the like. When creating an annotation, a user of the client device 110 specifies the portion of the content with which to associate the annotation. The specified portion may be a spatial area of the content (e.g., a portion of an image), a temporal segment of the content (e.g., a segment of an audio file), a page of the content, both a spatial and temporal portion of the content (e.g., an area within one or more frames of a video), and/or another portion of the content. User comments added to the content are linked to the specified portion. In one embodiment, users can reply to an annotation in the electronic content, creating a comment chain associated with the specified portion of the content and configured for display along with the electronic content.

The client device 110 communicates annotations created by users to the content server 120, which may display the content and annotations to users of other client devices 110. Thus, for example, the client device 110 enables a user to comment on a specified portion of a document and share the comment with other users via the content server 120. The client devices 110 used by the other users display the comment to the other users and indicate the portion of the document with which the comment is associated.

In one embodiment, the types of actions a user may take on a client device 110 depend on the configuration of the client device 110. For example, a mobile device may allow a user to view content and annotations, create new annotations, and add comments to the annotations, but may not allow the user to modify the portion of the content with which an annotation is associated. A larger computing device (e.g., a desktop or laptop computer) may allow the user to also modify the annotation.

The content server 120 facilitates sharing of electronic content and associated annotations between the client devices 110. The content server 120 may be any content storage device or system, such as a file hosting service, a document management system, or an email server. Users of the client devices 110 may share electronic content and associated annotations using the content server 120. In one embodiment, the content server 120 stores the electronic content and any annotations associated with the content, and users access the content by directly accessing the content server 120. For example, a user may share a document with another user by uploading the document to the content server 120 and sending the other user a link to the document's location at the server 120. Any users who have the link to the document may access the document via the content server 120 to view the content of the document and any associated annotations, as well as to create or modify annotations associated with the content. In another embodiment, electronic content and its associated annotations are stored at client devices 110, and the content server 120 synchronizes the content by pushing changes made to a content item at a first client device 110 (such as the creation of a new annotation) to one or more other client devices 110 storing the content item. In yet another embodiment, the content server 120 stores annotations associated with electronic content stored at client devices 110, and synchronizes the annotations with the electronic content at the devices 110.

The content server 120 may encrypt the content or otherwise control access to the content by unauthorized users. For example, the content server 120 may require a user to provide login credentials to access a particular document or set of documents the user has been authorized to access. In one embodiment, users may be provided with different levels of access. For example, some users may be given both read and write access to a content item, permitting the user to view the content item and any associated annotations, edit the content item, and annotate the content item. Other users may be given annotation-only permissions for a content item, allowing the user to add annotations or comments to the content item but not allowing the user to modify the content item itself.

The client devices 110 and content server 120 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2B:
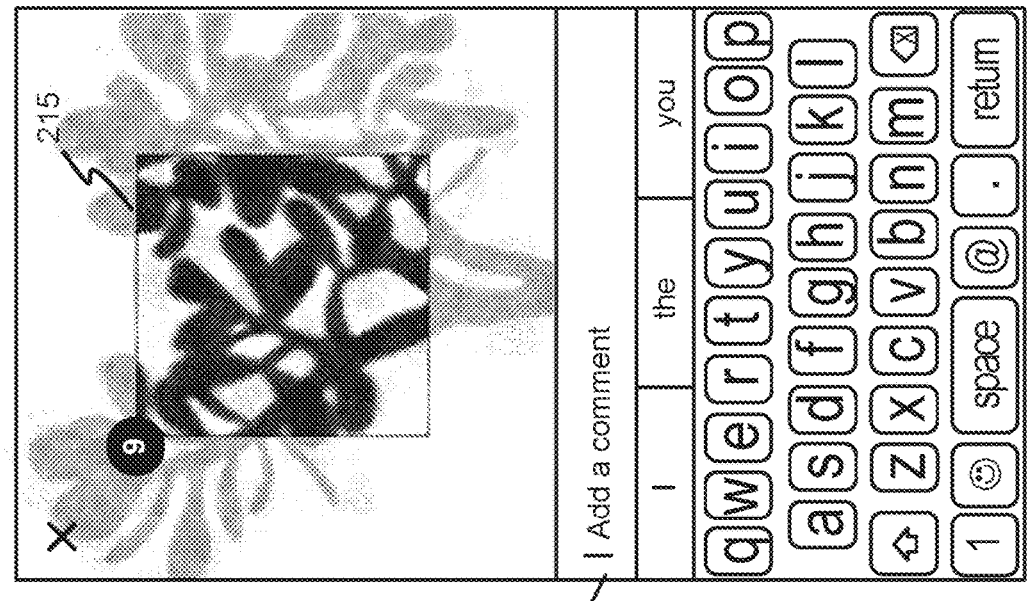
FIGS. 2A-2D illustrate a process performed at the client device for creating an annotation associated with electronic content, according to one embodiment.
Figure 2A:
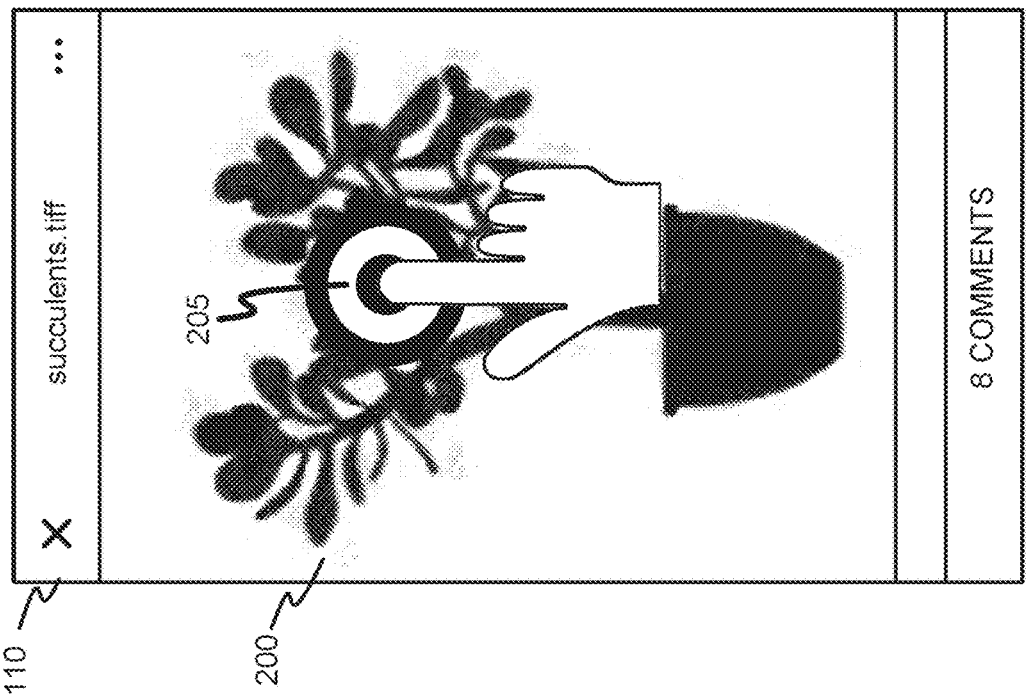

FIGS. 2A-2D illustrate a process performed at the client device 110 for creating an annotation associated with electronic content, according to one embodiment. In the example of FIGS. 2A-2D, the process is described with respect to an image 200 as an example type of electronic content. However, other content types may be annotated by processes similar to those described herein. As shown in FIG. 2A, the client device 110 displays the image 200. While the image 200 is displayed, a user input 205 is received to create an annotation associated with the image. For example, FIG. 2A illustrates a touch input (e.g., a press-and-hold input) received at a touchscreen display of the client device 110 as the input 205 to create an annotation, although the input may alternatively be received by other input devices of the client device 110 (such as a mouse).

In one embodiment, the user input 205 indicates a region of the image 200 with which to associate the annotation. In response to the input 205, the client device 110 displays a text entry box 210 and a selection box 215, as shown in FIG. 2B. The user can enter text, such as commentary on the image 200, into the text entry box 210 as a comment associated with the annotation. The selection box 215 defines a region of the image 200 with which the user desires to associate the annotation. In one embodiment, the user can change the dimensions of the selection box 215, increase or decrease a zoom level of the image 200, and/or move the position of the selection box 215 or the image 200 on the display of the client device 110 to change the region of the image 200 that will be associated with the annotation. Although FIG. 2B illustrates the selection box 215 having a rectangular shape, the selection box 215 may be any of a variety of other shapes such as a circle, a triangle, or a freeform polygon.

Figure 2C:
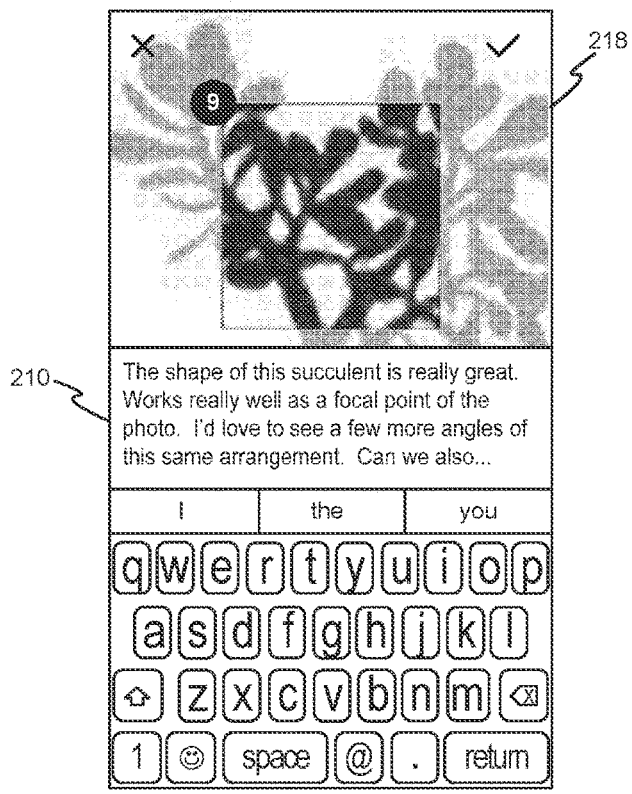
Figure 2D:
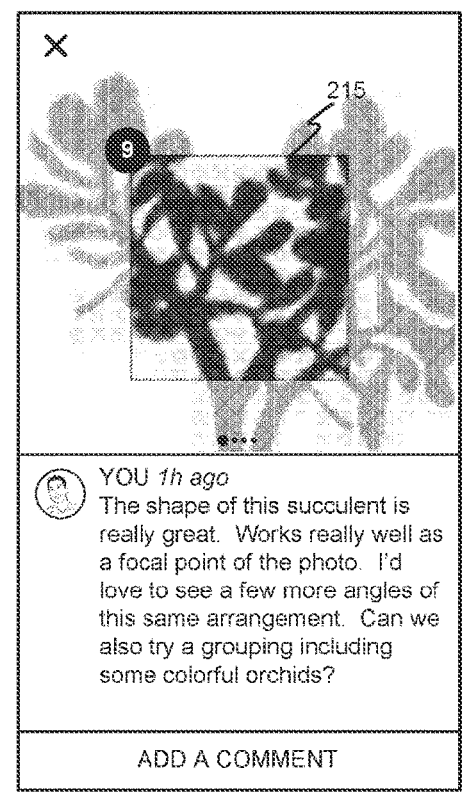

FIG. 2C illustrates text entered by the user into the text entry box 210. When the user confirms creation of the annotation (by, for example, selecting the check mark 218), the client device 110 creates an annotation using the text entered by the user and associates the annotation with the portion of the document identified by the selection box 215. The annotation created by the client device 110 is shown in FIG. 2D. The client device 110 sends the text to the content server 120, which stores the text and a location of the selection box 215 within the image 200 as an annotation of the image 200.

Figure 3B:
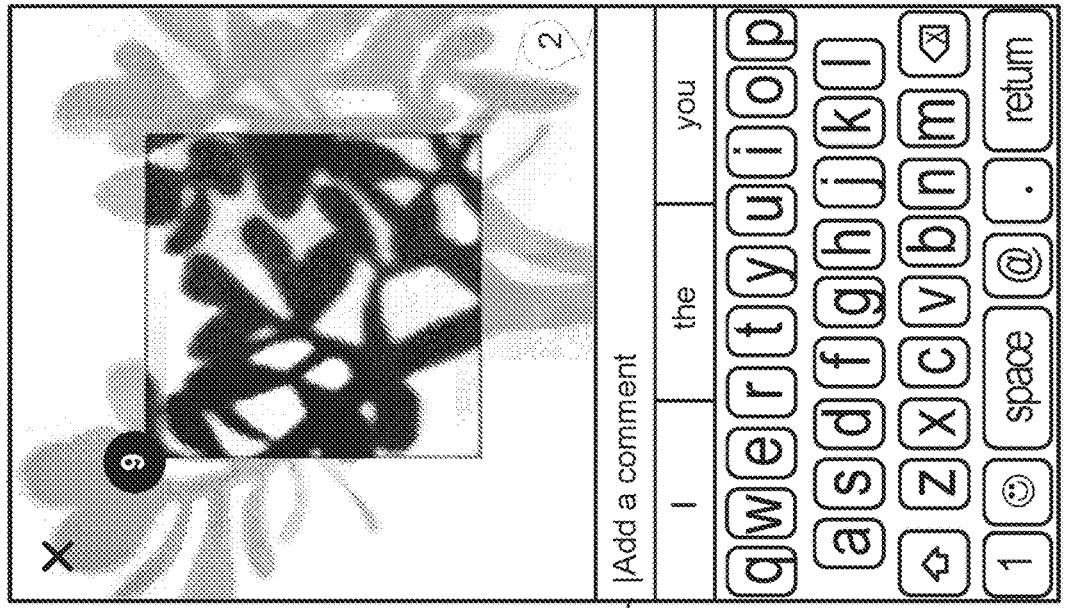
FIGS. 3A-3D illustrate a process performed at the client device for replying to an annotation associated with electronic content, according to one embodiment.
Figure 3A:
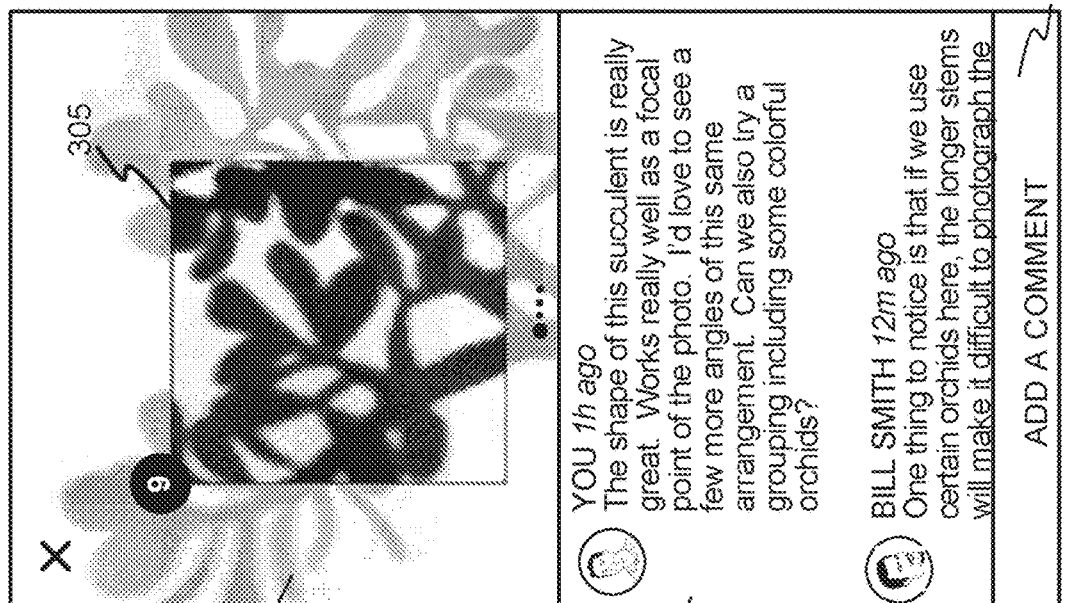
Figure 3D:
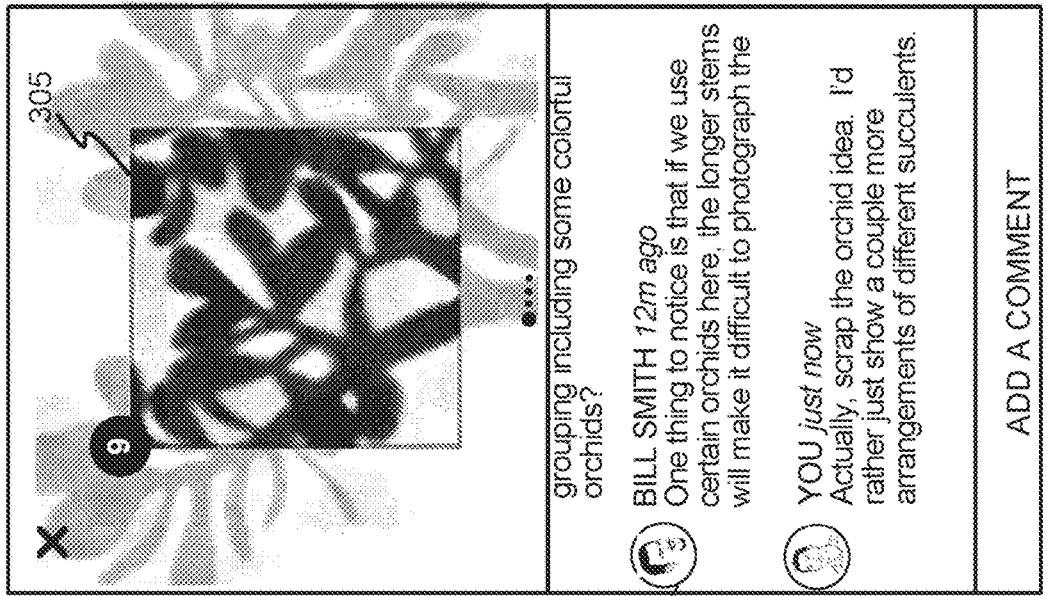
Figure 3C:
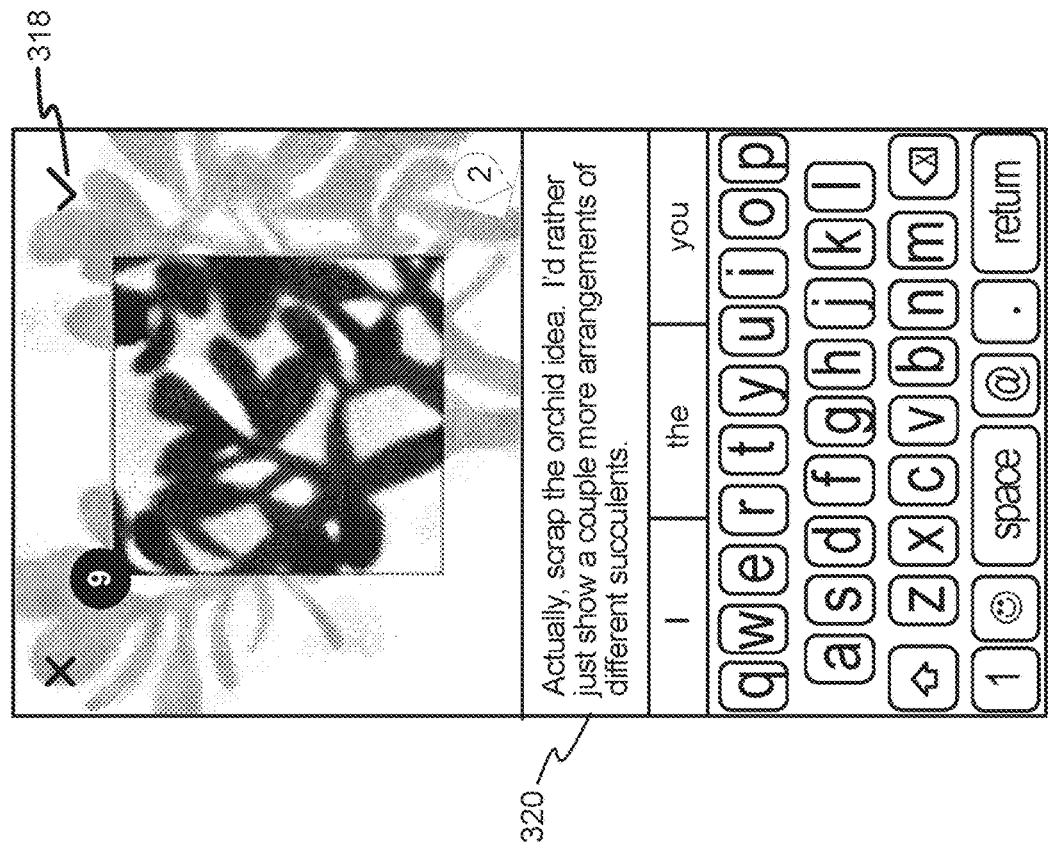

FIGS. 3A-3D illustrate a process performed at the client device 110 for adding a comment to an existing annotation associated with electronic content, according to one embodiment. FIG. 3A illustrates an annotation 305 associated with the image 200. The annotation 305 includes a comment chain 310, comprising one or more comments provided by users of the client devices 110. A user input 315 to add a comment to the comment chain associated with the annotation 305 is received. For example, the client device 110 receives a touch input at an "add a comment" button. In response to the input 315, the client device 110 displays a text entry box 320, as shown in FIG. 3B, for receiving the comment from the user of the client device 110. FIG. 3C illustrates text entered by the user into the text entry box 320. When the user confirms the comment (by, for example, selecting the check mark 318), the client device 110 associates the comment with the annotation 305. FIG. 3D illustrates the comment added to the comment chain 310 associated with the annotation 305. Thus, a user of the client device 110 can reply directly to a comment associated with the image 200.

Figure 4:
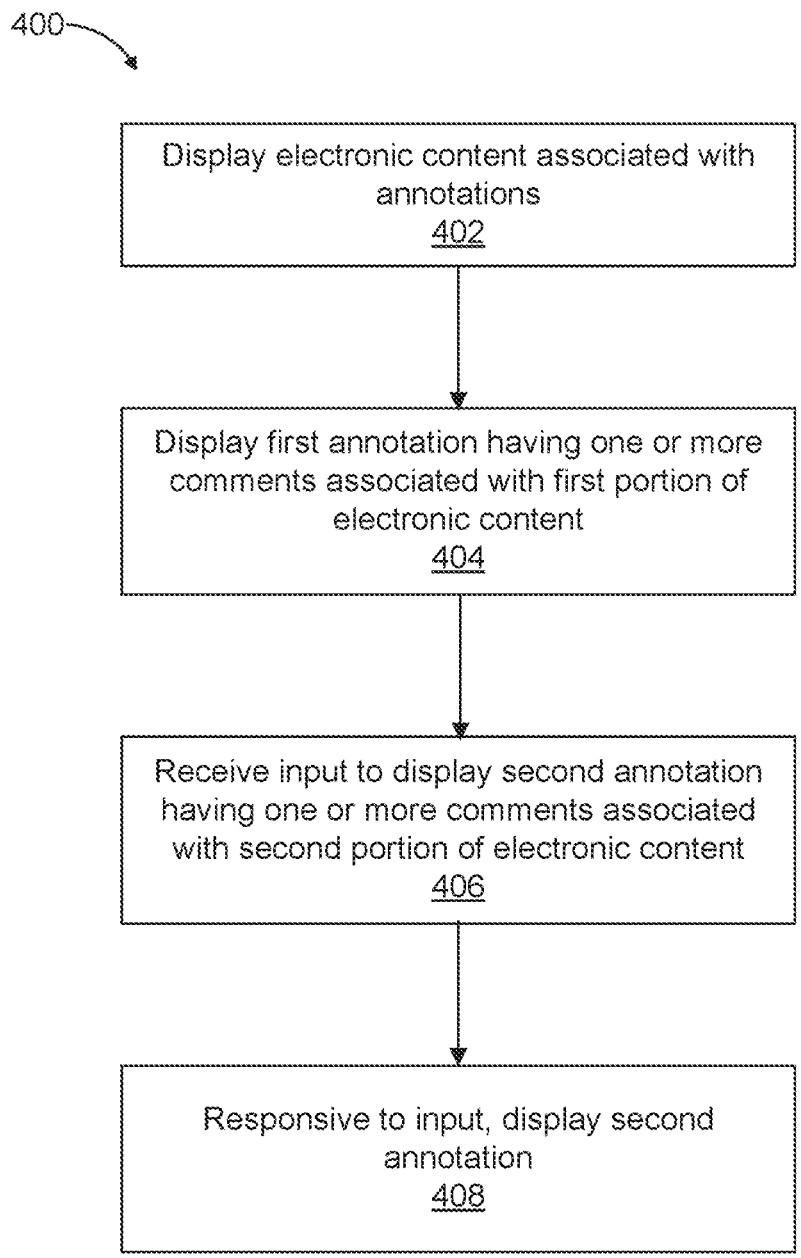
FIG. 4 is a flowchart illustrating a process for displaying annotations associated with electronic content, according to one embodiment.

FIG. 4 is a flowchart illustrating a process 400 for displaying annotations associated with electronic content, according to one embodiment. In one embodiment, the process 400 shown in FIG. 4 is performed by a client device 110. The process 400 may include different, additional, or fewer steps, and the steps may be performed in different orders. FIG. 4 is described with respect to the user interfaces shown in FIGS. 5A-5D.

Figure 5B:
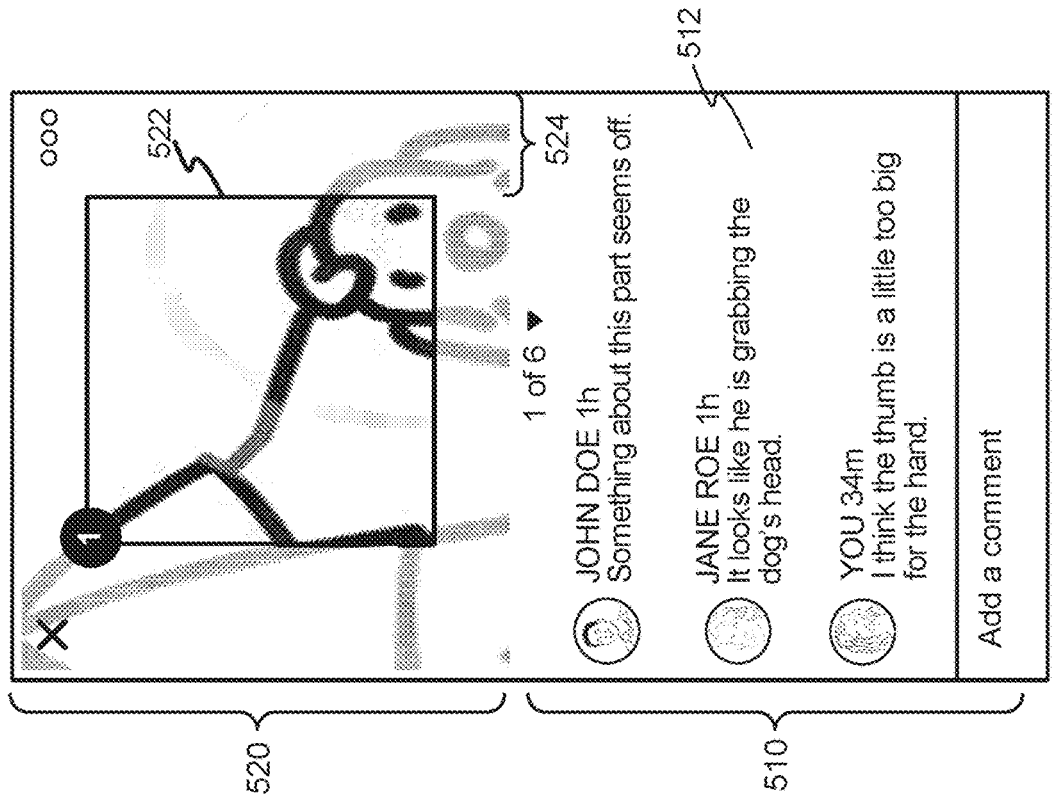
FIGS. 5A-5D illustrate a process performed at the client device for displaying annotations associated with electronic content, according to one embodiment.
Figure 5A:
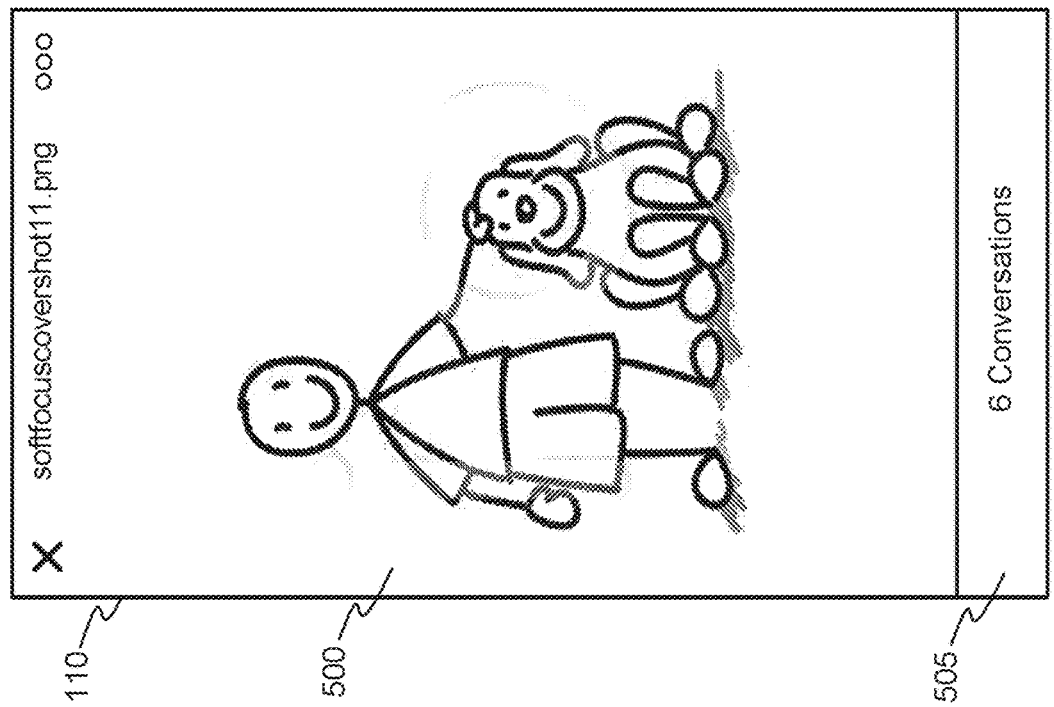

Referring to FIG. 4, the client device 110 displays 402 electronic content associated with a plurality of annotations. Each annotation corresponds to a respective portion of the electronic content. Depending on the format of the electronic content, the annotation may correspond to a spatial region within the content, a spatial region within the content at a particular time, or a spatial region on a particular page of the content. FIG. 5A illustrates an image 500, as example electronic content, displayed by the client device 110. In one embodiment, the client device 110 also displays an annotation bar 505 indicating a number of annotations associated with the image 500. The client device 110 may indicate the annotations associated with the image 500 in a variety of other manners, such as displaying numbered or lettered identifiers of the annotations within the image 500. The annotation bar 505 may also be displayed at a different location on the display than shown in FIG. 5A.

The client device 110 displays 404 a first annotation, which includes one or more comments associated with a first portion of the electronic content. To display an annotation associated with the image 500, a user may provide an input at the annotation bar 505 shown in FIG. 5A. For example, the user taps at the annotation bar 505 or swipes the annotation bar 505 upwards on the display of the client device 110. As shown in FIG. 5B, the client device 110 in one embodiment displays one or more comments 512 corresponding to a first annotation in a first region 510 of the display, and displays a portion of the image 500 with which the first annotation is associated in a second region 520 of the display. The first region 510 of the display may be scrollable to display additional comments 512 associated with the first annotation.

In one embodiment, the client device 110 displays the electronic content at a zoom level such that the first portion is displayed with a border defining a distance between at least one side of the first portion and an edge of the display of the client device 110. The border may be a fixed size (e.g., 100 pixels), a fixed portion of the display area displaying the first portion (e.g., 10%), or dynamically determined based on the size and shape of the first portion. For example, as shown in FIG. 5B, the image 500 displayed in the second region 520 of the display such that the spatial region 522 associated with the first annotation is displayed, as well as a border 524 specifying a distance between a side of the spatial region 522 and an edge of the display. In another embodiment, the client device 110 displays the electronic content at a specified zoom level within the second region 520 of the display, regardless of the size of the first portion of the electronic content associated with the first annotation.

Figure 5D:
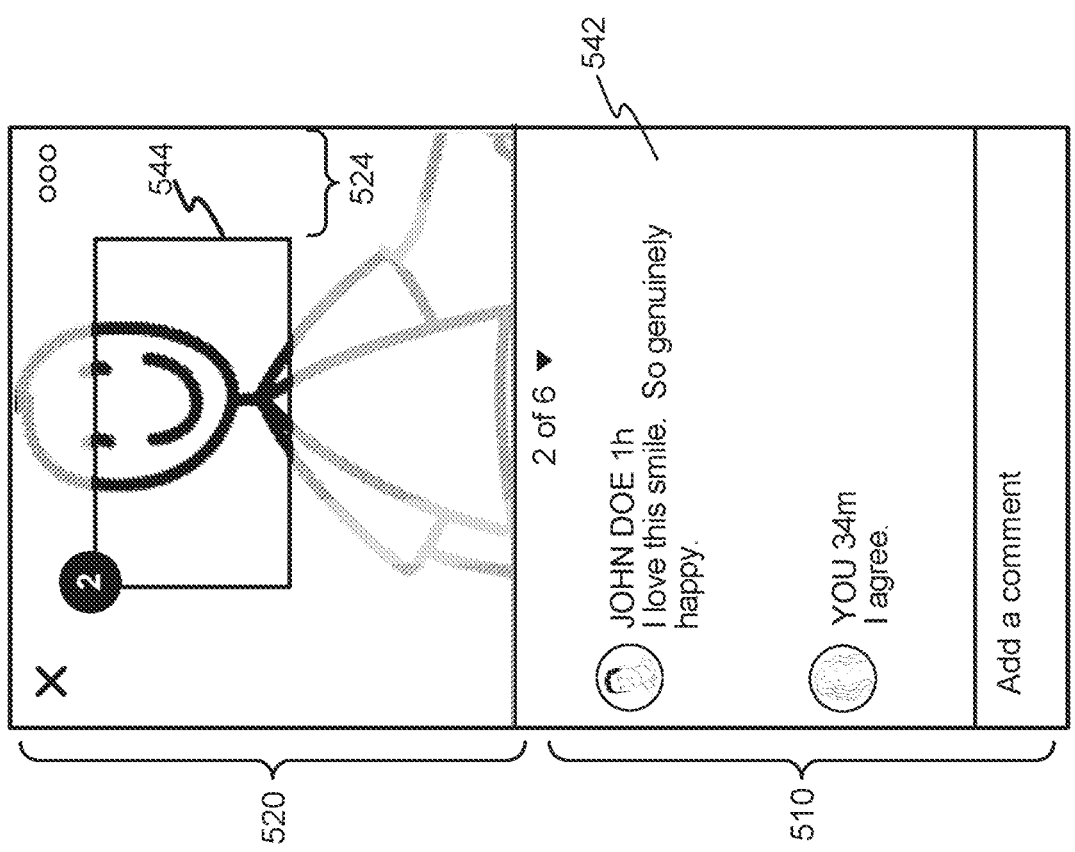
Figure 5C:
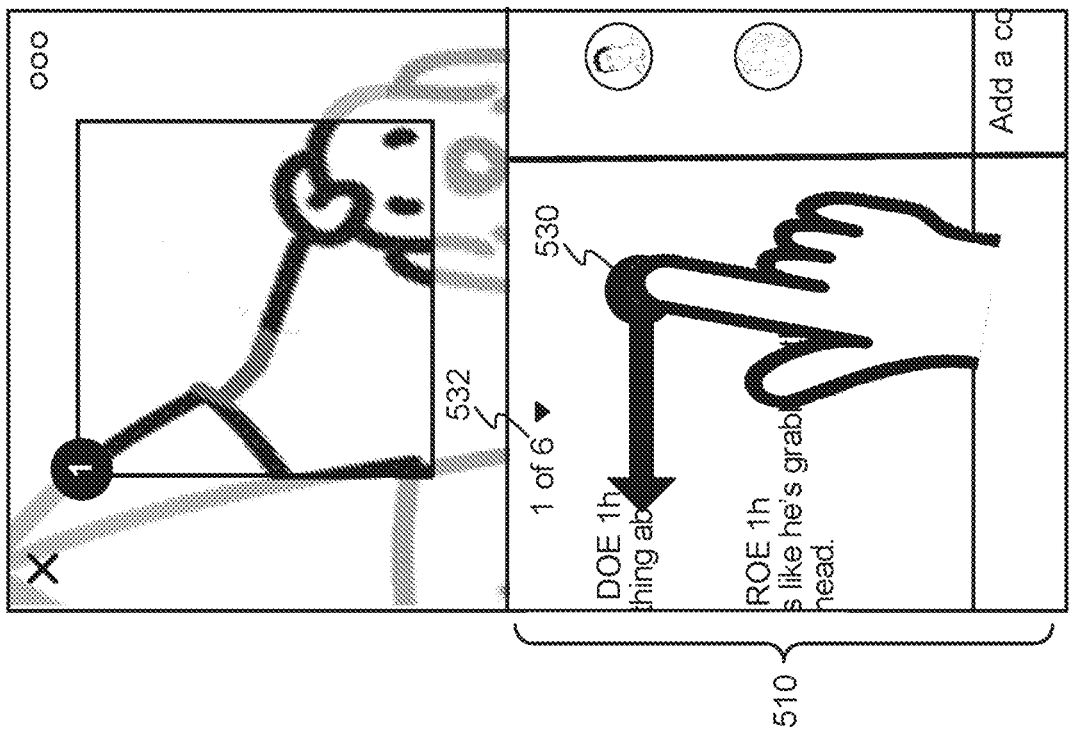

The client device 110 receives 406 an input to display a second annotation associated with the electronic content. Like the first annotation, the second annotation includes one or more comments and is associated with a second portion of the electronic content. FIG. 5C illustrates an example user input 530 received 406 by the client device 110 to navigate to a second annotation associated with the image 500. In the example of FIG. 5C, the user input 530 is a swipe gesture received in the first region 510 of the display. In other embodiments, a user may navigate to a second annotation by repositioning the image within the second region 520 of the display to the location associated with the second annotation, selecting the second annotation from a menu 532, selecting an arrow key of the client device 110 or an arrow button displayed by the client device 110, or providing any of a variety of other types of input.

In response to the user input 530, the client device 110 displays 408 the second portion of the electronic content and the one or more comments associated with the second annotation. FIG. 5D illustrates example comments 542 associated with a second annotation that are displayed in the first region 510 of the display, and a portion of the image 500 with which the second annotation is associated displayed in the second region 520 of the display. The portion of the image displayed in the second region 520 of the display includes the second portion 544 with which the second annotation is associated. In one embodiment, the client device 110 automatically pans and/or zooms the electronic content to display the second portion of the content associated with the second annotation, without a manual input from the user to pan or zoom the image. When transitioning to the second annotation, the client device 110 may pan or zoom the electronic content until the second portion of the content is displayed at a predetermined position within the first region 510 of the display. For example, as shown in FIG. 5D, the second portion 544 is displayed with the border 524 defining a distance between a right side of the second portion 544 and a right edge of the display. The client device 110 may additionally or alternatively display the second portion 544 with borders on other sides, or may display the electronic content at a predetermined zoom level regardless of the size of the second portion 544.

FIGS. 6A-6E illustrate an example of the process 400 when the electronic content is a multipage document and annotations are associated with different pages of the document.

Figure 6B:
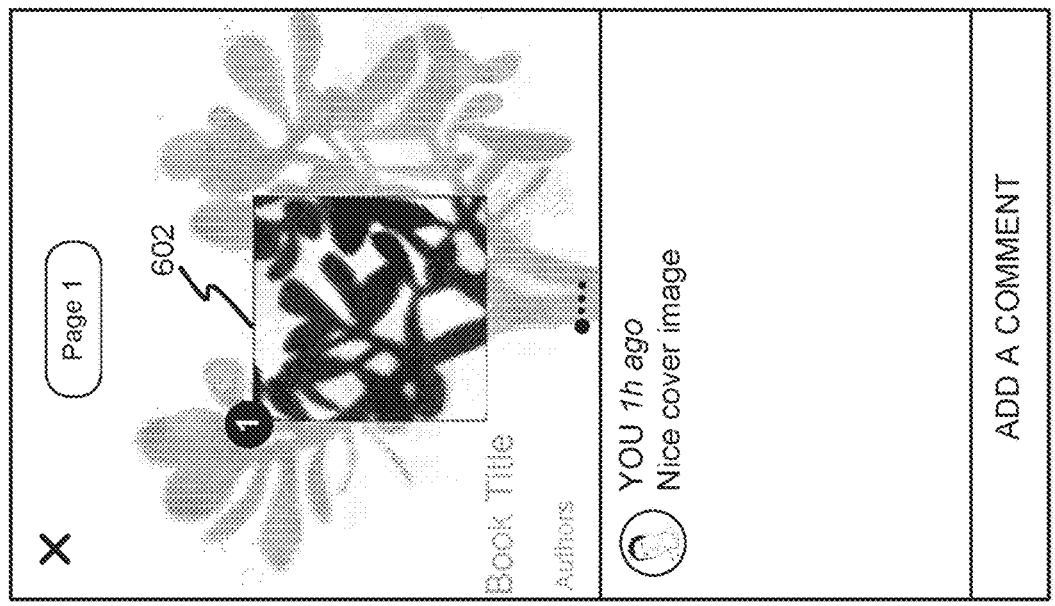
FIGS. 6A-6F illustrate a process performed at the client device for displaying annotations associated with a multi-page document, according to one embodiment.
Figure 6A:
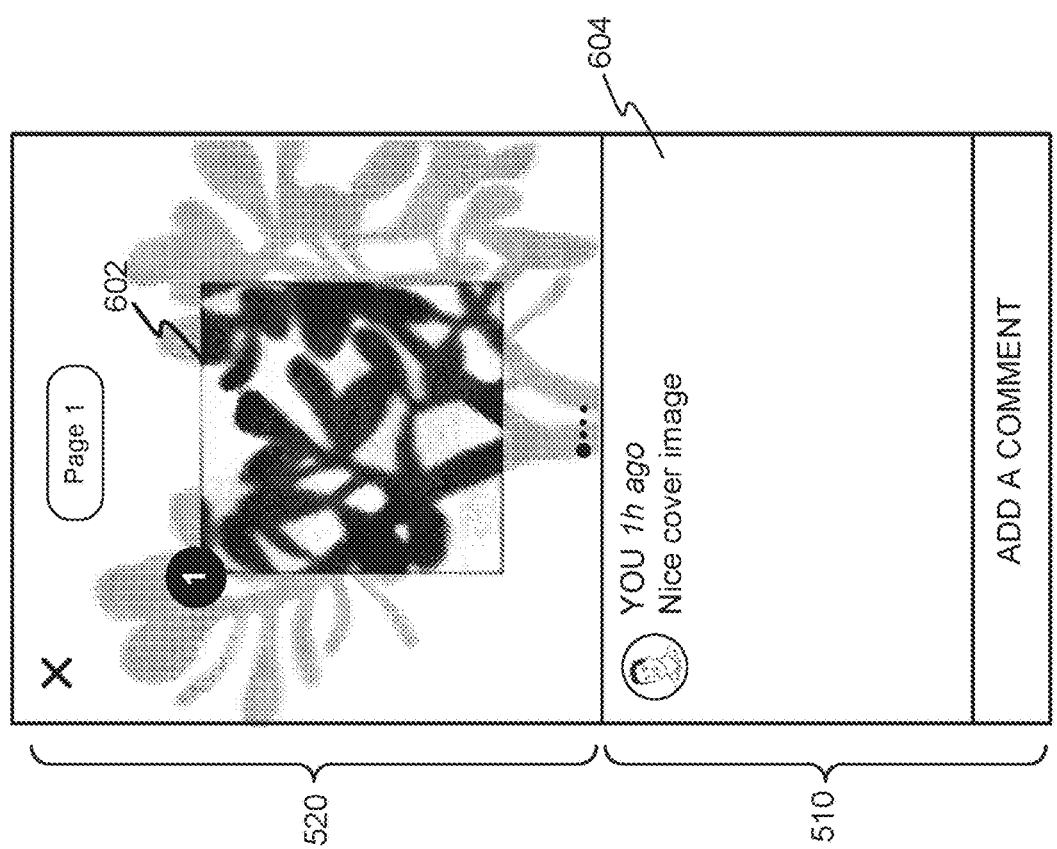

As shown in FIG. 6A, the client device 110 displays a first annotation associated with a first portion 602 of the document. In the example of FIG. 6A, the first portion 602 is a portion of page 1 of the document. The first annotation includes at least one comment 604, which in one embodiment is displayed in the first region 510 of the display while the portion 602 of the document is displayed in the second region 520.

When transitioning from the first annotation to a second annotation on a different page (e.g., in response to a user swipe gesture received at the first region 510 of the display), the client device 110 shows an animation including content of the document between the portion associated with the first annotation and the portion associated with the second annotation. In one embodiment, as shown for example in FIGS. 6B-6E, the animation zooms out from the first portion of the document until one or more pages are displayed, scrolls past representations of pages of the document between the first and second annotations, and zooms into the portion of the document associated with the second annotation.

Figure 6D:
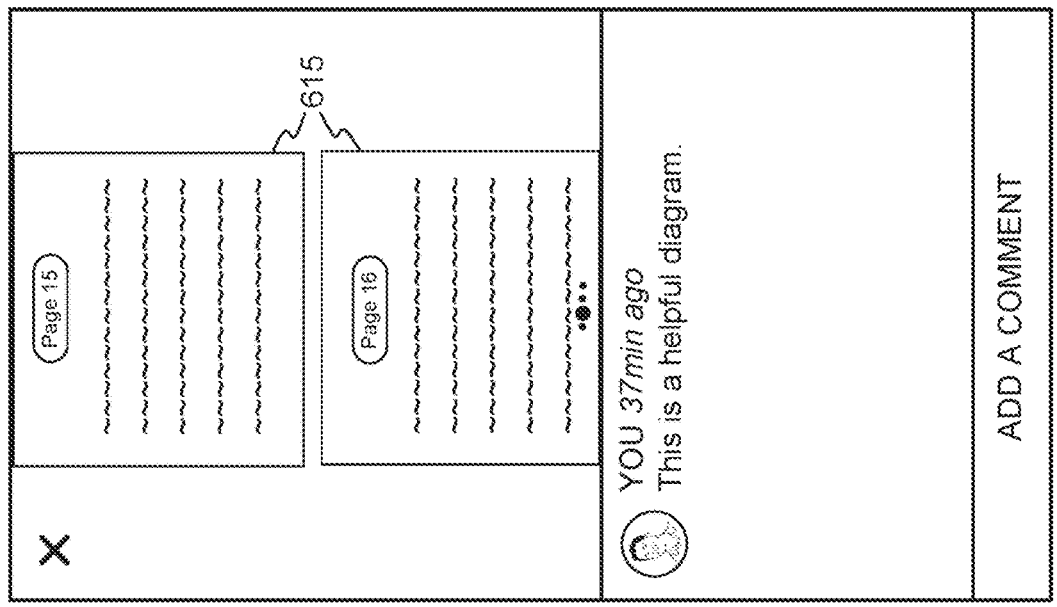
Figure 6C:
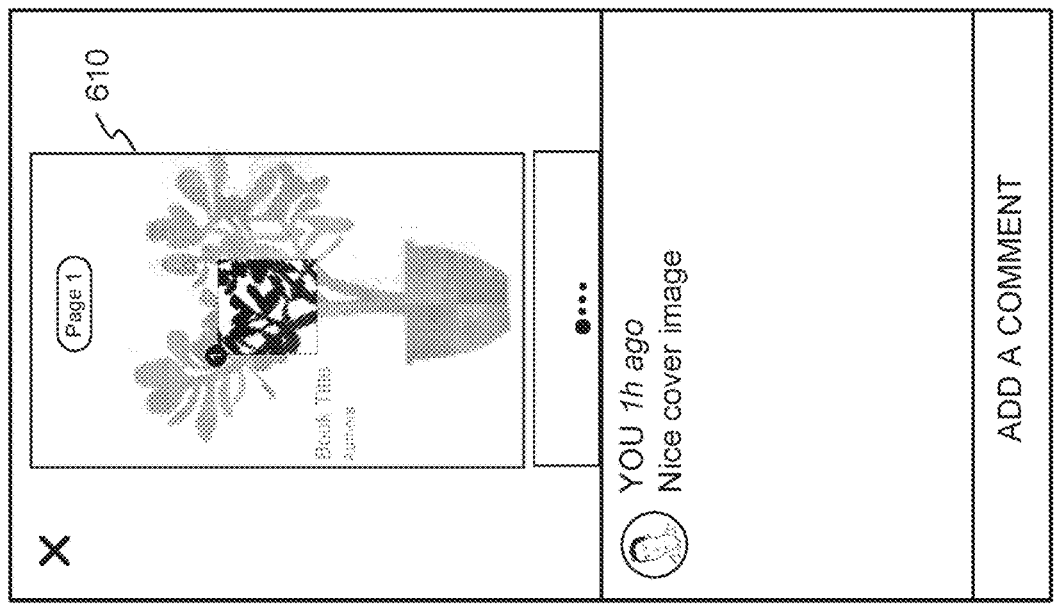

FIG. 6B illustrates an example of the client device 110 zooming out from the portion 602 of the document associated with the first annotation, and FIG. 6C illustrates the display zoomed out to show a representation 610 of the entire first page of the document. Although FIG. 6C shows an example in which the client device 110 zooms out the displayed portion of the document until one document page is shown in its entirety, the zoom level of document pages during the transition to the second annotation may be greater or lesser than shown in FIG. 6C. For example, the client device 110 may zoom out until multiple pages are displayed.

FIG. 6D illustrates the client device 110 scrolling past representations 615 of pages of the document between the first page and page 18, where the second annotation is located. In one embodiment, the client device 110 displays the intervening pages if the pages are cached at the client device 110 or retrieved quickly enough from the content server 120 to display during the annotation. If the pages are not locally cached and the network connection between the client device 110 and the server 120 is slower, the client device 110 may instead display blank page outlines of the intervening pages or other representations of the pages.

Figure 6E:
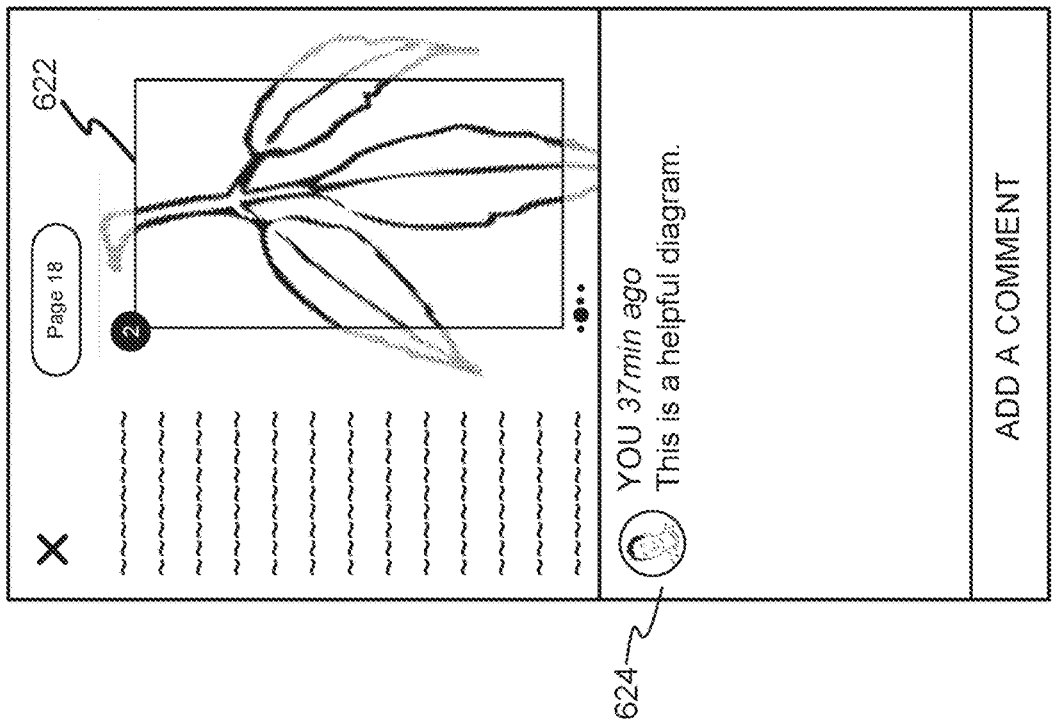
Figure 6F:
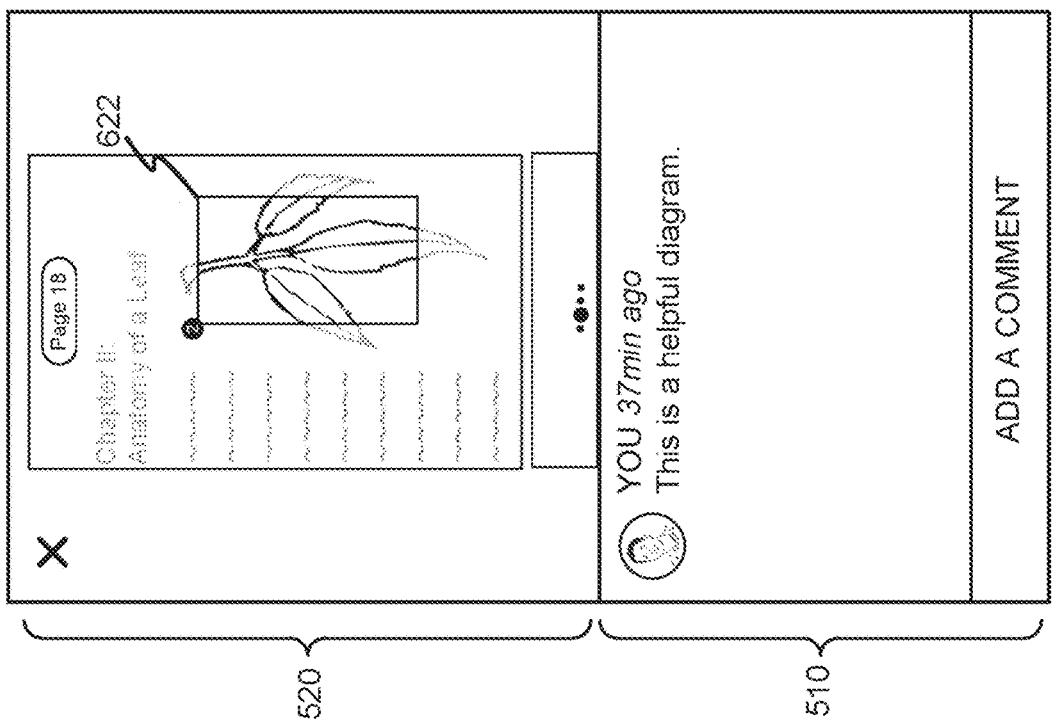

FIG. 6E illustrates the client device 110 beginning to zoom in on a second portion 622 of the document with which the second annotation is associated, and FIG. 6F illustrates the display zoomed in on the second portion 622. In one embodiment, the client device 110 zooms in on the portion 622 until it is displayed at a specified zoom level. In another embodiment, the client device 110 zooms in until the portion 622 is displayed with a border defining a distance between at least one side of the portion 622 and an edge of the display. While the portion 622 of the document is displayed (e.g., in the second region 520 of the display), the client device 110 also displays the one or more comments 624 associated with the second annotation.

The processes described with respect to FIG. 4 and illustrated in FIGS. 5A-6E enable a user to easily view and create annotations associated with electronic content. Because a communication channel is integrated into a content viewer, the user of the client device 110 does not need to switch between applications to view the content and add comments to the content. This integration of a communication channel into a content viewer is particularly advantageous when the client device 110 is a mobile device with a relatively small display area (e.g., a mobile phone), since switching between applications on a mobile device significantly increases the cognitive burden to the user and the amount of time the user would need to spend to annotate the content. Moreover, by linking an annotation to a specified portion of the content and showing the specified portion while displaying the annotation, the client device 110 enables a user to create annotations that specifically identify the portion of the content of interest to the user. These annotations enable the user to more clearly communicate comments on the electronic content with other users, improving user workflow when collaborating on documents.

CONCLUSION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A system comprising:
a mobile device having a processor and a memory, the mobile device executing an application that generates a graphical user interface which is displayed to a user, the mobile device adapted to receive an image from the content server and to display the image to the user;
the mobile device adapted to display the image on the graphical user interface;
the mobile device adapted to receive, while displaying the image on the graphical user interface, a first user input to view a first annotation to the image responsive to receiving the first user input, displaying at least one comment associated with the first annotation in a first region of the display and displaying a first region of the image with which the first annotation is associated in a second region of the display;
the mobile device adapted to, while displaying first region of the image on the display, receive a second user input via the graphical user interface to view a second annotation; and
the mobile device adapted to, responsive to the second user input, navigate from the first annotation to a second annotation associated with the image, display at least one comment associated with the second annotation in the first region of the display and display a second region of the image with which the second annotation is associated in the second region of the display such that the at least one comment associated with the second annotation and the second region of the image are displayed together.

2. The system of claim 1, wherein the mobile device is adapted to display on the graphical user interface an annotation bar which indicates any annotations associated with the image.

3. The system of claim 1, wherein the mobile device is adapted to: receive user input selecting one of the annotations associated with the image based on user interaction with the graphical user interface; display the text entry box together with a corresponding selection box in the graphical user interface; receive an additional comment from the user via the text entry box; responsive to user input confirming the additional comment, update the selected one of the annotations with the additional comment; and sending the updated annotation to the content server for storage.

4. The system of claim 1, wherein the graphical user interface is adapted to allow a user to change a size of the selection box.

5. The system of claim 1, wherein the graphical user interface is adapted to allow a user to move a position of the selection box.

6. The system of claim 1, wherein the mobile device is adapted to display the first region of the image with which the first annotation at a first zoom level.

7. The system of claim 1, wherein the mobile device is adapted to: while displaying the image, receive user input via the graphical user interface to view the first annotation; responsive to the user input to view the first annotation, display at least one comment associated with the first annotation in a first region of the graphical user interface and display the first region of the image with which the first annotation is associated in a second region of the graphical user interface such that the at least one comment associated with the first annotation and the first region of the image are displayed together.

8. The system of claim 7, wherein the mobile device is adapted to display the second region of the image with which the second annotation is associated comprises displaying the second region of the image at a second zoom level.

9. The system of claim 7, wherein the mobile device is adapted to display at least one comment associated with the first annotation in the first region of the graphical user interface, wherein the first region of the graphical user interface is scrollable to display an additional comment associated with the first region of the graphical user interface.

10. A method of managing annotations associated with electronic content, the method comprising:
executing an application at a mobile device to provide a graphical user interface and interact with a content server to display an image stored at the content server on a display of the mobile device;
while displaying the image, receiving a first user input to view a first annotation to the image;
responsive to receiving the first user input, displaying at least one comment associated with the first annotation in a first region of the display and displaying a first region of the image with which the first annotation is associated in a second region of the display;
while displaying first region of the image on the display of the mobile device, receiving a second user input via the graphical user interface to view a second annotation; and
responsive to the second user input, navigating from the first annotation to a second annotation associated with the image, displaying at least one comment associated with the second annotation in the first region of the display and displaying a second region of the image with which the second annotation is associated in the second region of the display such that the at least one comment associated with the second annotation and the second region of the image are displayed together.

11. The method of claim 10, wherein the graphical user interface is adapted to allow a user to change a size of the selection box.

12. The method of claim 10, wherein the graphical user interface is adapted to allow a user to move a position of the selection box.

13. The method of claim 10, further comprising: based on a user interaction with the graphical user interface, determining a level of zoom for the first annotation; and sending the level of zoom for the first annotation to the content server.

14. The method of claim 10, wherein displaying the second region of the image with which the second annotation is associated comprises automatically panning the image to display the second region of the image.

15. The method of claim 14, further comprising:
while displaying the at least one comment associated with the first annotation, providing a first control in the graphical user interface to allow a user to add a new comment to the first annotation; and
based on user interaction with the graphical user interface, receiving the new comment; and adding the new comment to a comment chain associated with the first annotation.

16. The method of claim 14, wherein displaying the first region of the image with which the first annotation is associated comprises zooming the image to display the first region of the image at a first zoom level.

17. The method of claim 16, wherein displaying the second region of the image with which the second annotation is associated comprises displaying the second region of the image at a second zoom level.

18. The method of claim 14, wherein the graphical user interface is adapted to allow a user to navigate from the first annotation to the second annotation via a swipe gesture in the first region of the display.

19. The method of claim 14, wherein when the at least one comment associated with the first annotation is displayed in the first region of the display, the first region of the display is scrollable to display an additional comment associated with the first region of the display.

* * * * *